(12) United States Patent
Ling et al.

(10) Patent No.: US 9,445,411 B2
(45) Date of Patent: Sep. 13, 2016

(54) CONTROLLING UPLINK TRANSMISSIONS FROM INTERFERING STATIONS

(71) Applicant: ALCATEL-LUCENT USA INC., Murray Hill, NJ (US)

(72) Inventors: Jonathan Ling, North Brunswick, NJ (US); Dragan Samardzija, Highlands, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 193 days.

(21) Appl. No.: 14/043,534

(22) Filed: Oct. 1, 2013

(65) Prior Publication Data
US 2015/0092755 A1 Apr. 2, 2015

(51) Int. Cl.
| | |
|---|---|
| G08C 17/00 | (2006.01) |
| H04W 72/04 | (2009.01) |
| H04W 52/32 | (2009.01) |
| H04W 84/18 | (2009.01) |
| H04W 52/50 | (2009.01) |
| H04W 52/14 | (2009.01) |
| H04W 52/24 | (2009.01) |
| H04W 52/34 | (2009.01) |

(52) U.S. Cl.
CPC ......... *H04W 72/042* (2013.01); *H04W 52/325* (2013.01); *H04W 52/50* (2013.01); *H04W 84/18* (2013.01); *H04W 52/146* (2013.01); *H04W 52/242* (2013.01); *H04W 52/243* (2013.01); *H04W 52/343* (2013.01)

(58) Field of Classification Search
USPC ....... 370/230, 338, 348, 329, 328, 445, 208, 370/252, 277, 278, 312, 336, 350, 447, 503, 370/311, 332; 455/41.2, 452.1, 273, 41.1, 455/422.1, 434, 450, 501, 509, 516, 561, 455/562.1; 709/228, 234; 713/323, 600
See application file for complete search history.

(56) References Cited

U.S. PATENT DOCUMENTS

| | | | |
|---|---|---|---|
| 8,744,511 B2 * | 6/2014 | Jones et al. .................... | 455/522 |
| 8,774,140 B2 * | 7/2014 | Levy et al. .................... | 370/338 |
| 8,817,682 B1 * | 8/2014 | Goel et al. ..................... | 370/311 |
| 2005/0047384 A1 * | 3/2005 | Wax et al. ..................... | 370/338 |
| 2005/0285803 A1 * | 12/2005 | Iacono et al. ................. | 343/702 |
| 2007/0010237 A1 * | 1/2007 | Jones et al. ................ | 455/422.1 |
| 2007/0080781 A1 * | 4/2007 | Ginzburg et al. ............ | 340/7.21 |

(Continued)

FOREIGN PATENT DOCUMENTS

WO 2012112805 A1 8/2012

OTHER PUBLICATIONS

International Search Report and Written Opinion correlating to PCT/US2014/058160 dated Dec. 11, 2014, 9 pages.

*Primary Examiner* — Phuongchau Ba Nguyen
(74) *Attorney, Agent, or Firm* — Davidson Sheehan LLP

(57) ABSTRACT

An access point to transmit a first message that instructs stations (STAs) to bypass uplink transmissions for a first time interval indicated in the first message. The access point is to transmit one or more first messages at a transmission power sufficient for a first portion of the STAs to decode the one or more first messages and insufficient for a second portion of the STAs to decode the one or more first messages. The transmission power can be determined based on minimum transmit powers associated with the STAs. Subsequent second time intervals can be determined based on uplink transmissions received from the STAs during the first time interval.

1 Claim, 11 Drawing Sheets

(56) References Cited

U.S. PATENT DOCUMENTS

| | | | |
|---|---|---|---|
| 2008/0095137 A1* | 4/2008 | Levy et al. | 370/342 |
| 2008/0112351 A1* | 5/2008 | Surineni et al. | 370/312 |
| 2010/0081394 A1* | 4/2010 | Mashimo | 455/70 |
| 2010/0138549 A1* | 6/2010 | Goel | H04W 52/0225 709/228 |
| 2010/0157865 A1* | 6/2010 | Iyer et al. | 370/311 |
| 2010/0177757 A1* | 7/2010 | Kim et al. | 370/338 |
| 2011/0225440 A1* | 9/2011 | Kwon et al. | 713/323 |
| 2012/0207101 A1* | 8/2012 | Chang et al. | 370/329 |
| 2012/0230242 A1* | 9/2012 | Kim et al. | 370/312 |
| 2012/0263091 A1* | 10/2012 | Kim et al. | 370/312 |
| 2012/0320856 A1* | 12/2012 | Kim et al. | 370/329 |
| 2013/0023286 A1* | 1/2013 | Soma | H04W 4/02 455/456.1 |
| 2013/0044615 A1* | 2/2013 | Carrera et al. | 370/252 |
| 2014/0140333 A1* | 5/2014 | Park et al. | 370/338 |
| 2014/0314056 A1* | 10/2014 | Park et al. | 370/336 |
| 2014/0334387 A1* | 11/2014 | Doppler et al. | 370/329 |
| 2015/0063148 A1* | 3/2015 | Sadek | 370/252 |

\* cited by examiner

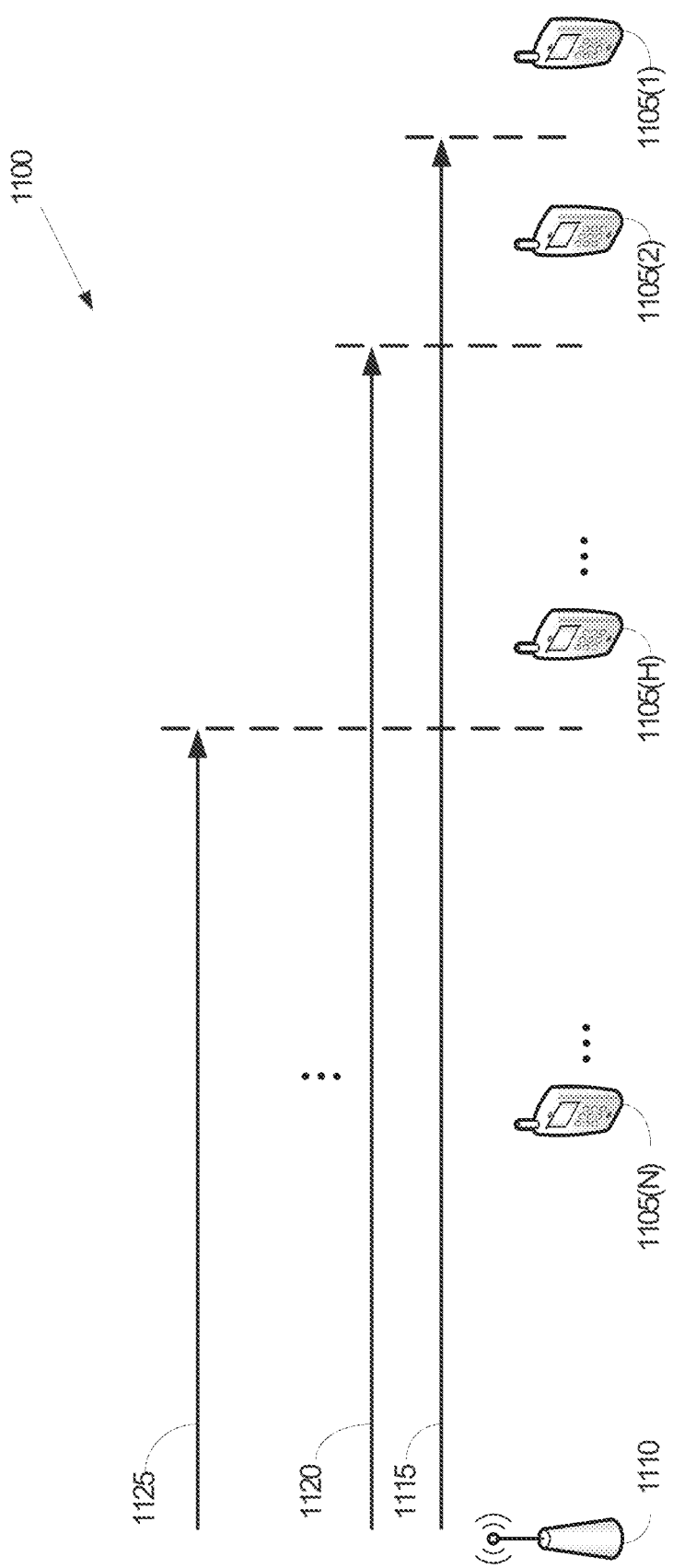

CONTROLLING UPLINK TRANSMISSIONS FROM INTERFERING STATIONS

BACKGROUND

1. Field of the Disclosure

The present disclosure relates generally to communication systems, and, more particularly, to wireless communication systems.

2. Description of the Related Art

Wireless communication systems such as Wi-Fi systems are prone to a "hidden node problem," which arises when two stations (STAs) are within range of the same access point, but are too far apart to be aware of each other. The two STAs are therefore hidden from each other. The hidden node problem can be exacerbated by the presence of obstructions between the STAs for the access points. For example, building penetration losses are typically on the order of 11-20 dB. Consequently, an indoor STA may be hidden from an outdoor STA even though they may be physically proximate to each other. Similarly, two indoor STAs may be hidden from each other if they are separated by one or more walls, doors, or other obstructions within the building.

Transmissions from one hidden STA can interfere with transmissions from the other hidden STA without either STA recognizing that interference is occurring. When two signals collide at an access point, the access point generally detects the stronger signal and treats the weaker signal as interference. Consequently, a stronger hidden STA can overwhelm a weaker hidden STA and consume an unfair proportion of the resources of the access point, particularly when a large proportion of the resources of the access point is available for use by the STAs so that there is a relatively small amount of "silent" time available for the weaker hidden STA to retry its uplink transmissions. The hidden node problem may also occur on the downlink when downlink transmissions from two access points, which are hidden from each other, collide at an STA. Two techniques are conventionally used to improve performance in presence of interference: dynamic channel assignment (DCA) and the request-to-send/clear-to-send (RTS/CTS) protocol.

In a system that employs DCA, each access point is assigned one frequency from a set of available frequencies and uses this frequency to communicate with all of its associated STAs. Neighboring access points can be assigned different frequencies, e.g., using a tiling algorithm, to limit interference between transmissions associated with the different access points. The effectiveness of DCA depends on the availability of a sufficient number of channels so that different channels can be allocated to all of the neighboring access points. For example, the 2 GHz band is often preferred in Wi-Fi systems due to lower path loss, greater coverage and signal-to-noise ratios (SNRs), and because it is compatible with legacy STAs. However, the 2 GHz band only has 3 channels, which is frequently insufficient to provide each neighboring access point with a different channel. The 5 GHz band has twenty 20 MHz channels, but only a subset of these channels operate at the maximum FCC transmit power. Wi-Fi systems that operate according to the 802.11ac standards support three or four 80 MHz channels, assuming full access to dynamic frequency selection (DFS) enabled bands. WiFi service providers (WISP) may offer a fixed frequency plan, in which case changing channels would cause interference to a neighboring cell. In these cases (e.g., 2 GHz usage, 802.11ac, and outdoor APs using high power, fixed frequency plan), DCA may not be able to assign a free channel to each access point. Furthermore, although DCA helps with external interference caused by transmissions associated with other access points, DCA does nothing to improve fairness between hidden STAs associated with the same access point.

The RTS/CTS protocol attempts to reduce collisions by allowing STAs to send an RTS frame that indicates that the STA would like to transmit information over the uplink to the access point. The access point replies with a CTS frame that indicates that the requesting STA is free to transmit information for a time interval. Other STAs that detect the CTS frame are to refrain from transmitting during the time interval indicated in the CTS frame. The RTS/CTS protocol is not completely effective in preventing collisions because there is a vulnerability period between the time that the RTS is transmitted and the time that the CTS is heard and decoded at the (potentially interfering) other STAs, which can legally transmit during the vulnerability period. Moreover, hidden STAs may not detect the RTS and may therefore continue to transmit until the hidden STA detects the CTS. Transmissions from the hidden STAs can collide with transmissions from the requesting STA during the vulnerability period. The likelihood of collisions increases as the channel utilization increases and, consequently, relatively strong STAs garner an increasing share of the available resources at higher channel utilizations. At very high channel utilizations, the strong STAs can completely monopolize the available resources and shut out the weaker STAs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 11 is a diagram of a fifth example of a wireless communication system according to some embodiments.

DETAILED DESCRIPTION

Resources can be fairly allocated to both strong and weak STAs by selectively requesting that the relatively strong STAs bypass transmission during some time intervals. For example, the access point can transmit a request, which may be referred to as a CTS-to-self request, to indicate that STAs should bypass transmission during a time interval indicated in the request. The transmission power of the request is determined so that it can be detected and decoded by the relatively strong STAs and will not be detected or decoded by the relatively weak STAs. For example, relatively strong STAs may be within a distance threshold from the access point and the relatively weak STAs may be beyond the distance threshold. The transmission power may then be determined so that the signal strength beyond the distance threshold is too low for the request to be detected by an STA. Consequently, the relatively weak STAs do not detect the request and are free to transmit during the time interval. The relatively strong STAs detect the request and bypass transmission during the time interval, even if they are hidden from the relatively weak STAs, thereby allowing the relatively weak STAs to transmit collision-free. The duration of the time interval can initially be set to a small value and may then be increased if the access point receives uplink traffic during the time interval or decreased if the access point does not receive uplink traffic during the time interval.

Figure 1:
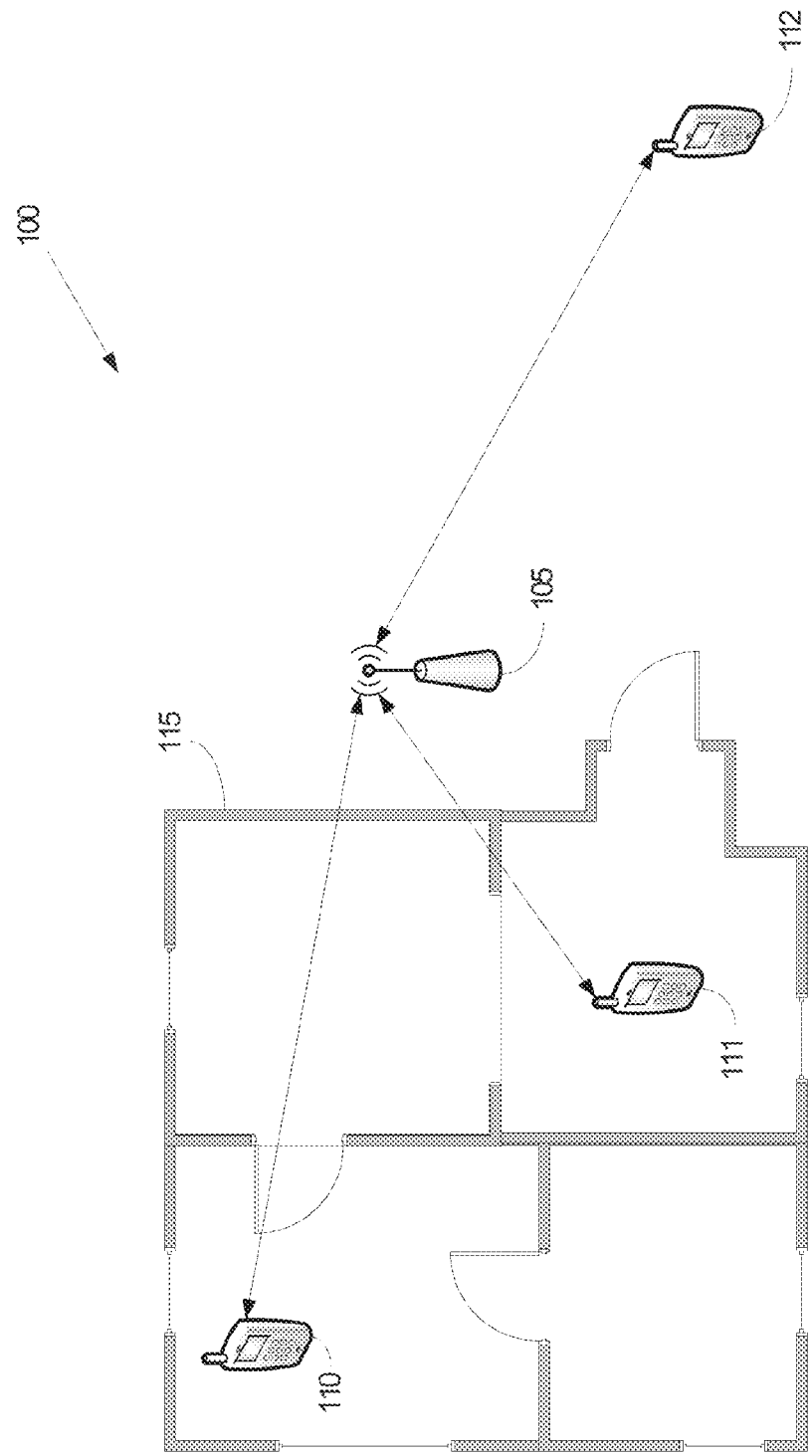
FIG. 1 is a diagram of a first example of a wireless communication system according to some embodiments.

FIG. 1 is a diagram of a first example of a wireless communication system 100 according to some embodiments. In the illustrated embodiment, an access point 105 is used to provide wireless connectivity to a corresponding geographic area or cell, which may include stations 110, 111, 112 (collectively referred to herein as "the STAs 110-112"). As used herein, the term "access point" will be understood to refer to a device that provides wireless connectivity to the STAs 110-112 within a corresponding geographic area. The term "access point" may therefore encompass base stations, base station routers, eNodeBs, macrocells, microcells, femtocells, picocells, and other types of devices. For example, the access point 105 may provide wireless connectivity according to Wi-Fi standards, 3GPP standards, IEEE 802 standards, or other communication standards.

A building 115 may be located within the geographic area served by the access point 105. As discussed herein, obstructions such as the doors, windows, or walls of the building 115 may significantly increase channel loss between the STAs 110-112 and the access point 105. Exemplary building penetration losses are typically on the order of 11-20 dB. For a given transmission power, the penetration losses may make it difficult or impossible for the STAs 110-112 to detect each other's presence. The STAs 110-112 may therefore be hidden from each other and uplink transmissions from the STAs 110-112 may collide at the access point 105. Collisions between signals transmitted by STAs 110-112 may result in relatively strong STAs 110-112 consuming and unfair proportion of the resources of the access point 105.

Figure 2:
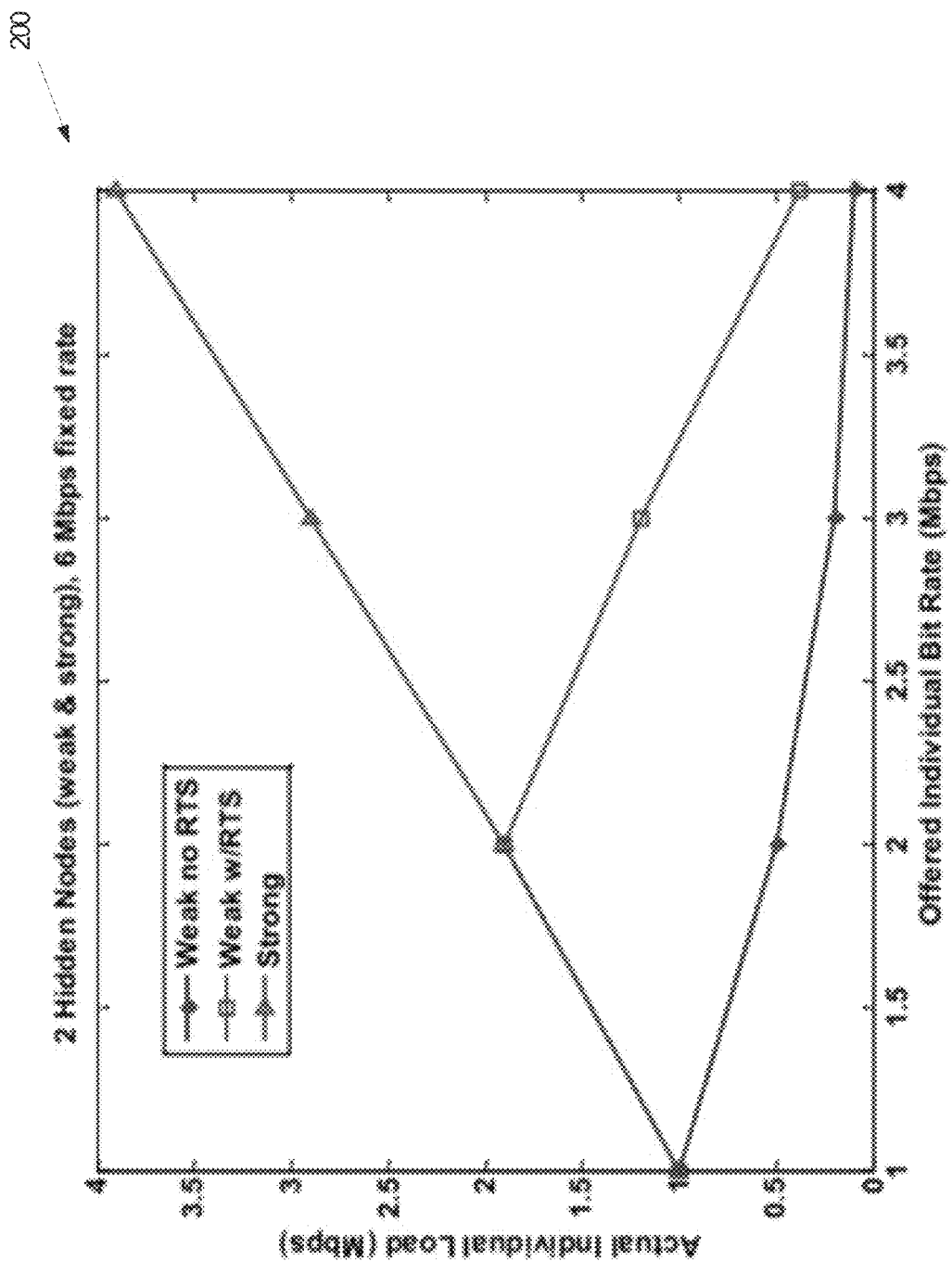
FIG. 2 is a plot of the results of a simulation of resources consumed by a strong station (STA), a weak STA that does not support the request-to-send/clear-to-send (RTS/CTS) protocol, and a weak STA that supports the RTS/CTS protocol according to some embodiments.

FIG. 2 is a plot 200 of the results of a simulation of resources consumed by a strong STA, a weak STA that does not support the RTS/CTS protocol, and a weak STA that supports the RTS/CTS protocol according to some embodiments. The strong STA may correspond to the STA 112 shown in FIG. 1, the weak STA that does not support the RTS/CTS protocol may correspond to the STA 111 shown in FIG. 1, and the weak STA that supports the RTS/CTS protocol may correspond to the STA 110 shown in FIG. 1. The horizontal axis of the plot 200 indicates the individual bit rate (in megabits per second, Mbps) that is offered by the access point to each STA. The vertical axis of the plot 200 indicates the actual individual load (in Mbps) achieved by each of the STAs.

The plot 200 shows the results for two scenarios: (1) the strong STA competing with the weak STA that does not support the RTS/CTS protocol and (2) the strong STA competing with the weak STA that supports the RTS/CTS protocol. The simulations were performed using an event driven simulator with a validated Wi-Fi model, whose packet traces have been compared to hardware. The raw bit rate is fixed at 6 Mbps and the packet length is 1.2 ms. The competing nodes (e.g., the strong STA and the weak STAs) produce constant bit-rate user datagram protocol (UDP) traffic and the RTS retry limit is set to 10 retries following a failed attempt to gain access to the access point. Full channel utilization is about 4 Mbps, so if each STA transmits at 1 Mbps then about ½ the airtime available to the access point is utilized. The "occupancy" of the access point is therefore 50% when each STA transmits at 1 Mbps.

In both cases, the strong STA is able to achieve an actual individual load that is approximately equal to the offered individual bit rate as the offered individual load is increased. However, an asymmetry in rates appears at relatively low offered individual bit rates and increases until the strong STA obtains nearly complete airtime access to the channel when the offered individual bit rate approaches 4 Mbps. For the weak STA that does not support the RTS/CTS protocol, collisions with uplink transmissions from the strong STA cause degradation in the actual individual load of the weak STA when the occupancy exceeds 50%. The weak STA is receiving a small fraction of the offered individual bit rate by the time the offered individual bit rate reaches 4 Mbps. The RTS/CTS protocol allows the weak STA to request exclusive access to the access point during some time intervals, which forestalls the degradation to the actual individual load of the weak STA until the offered individual bit rate exceeds 2 MBps. At higher bit rates, the strong STA consumes an increasingly large and unfair proportion of the resources of the access point.

Referring back to FIG. 1, the access point 105 may improve the fairness of uplink access by selectively instructing strong STAs 110-112 to bypass uplink transmission during time intervals indicated in a message. For example, the access point 105 may transmit a message instructing the STAs 110-112 to bypass uplink transmissions for a time interval indicated in the message. Some embodiments of the message are transmitted at a threshold power sufficient for a first portion of the STAs to decode the first message and insufficient for a second portion of the STAs to decode the message. For example, the relatively strong STA 112 may be able to detect and decode the message and the relatively weak STAs 110-111, which are obscured by the building 115, may not be able to detect and decode the message. The STA 112 may therefore bypass uplink transmissions during the time interval indicated in the message. However, since the STAs 110-111 not able to decode the message, the STAs 110-111 are unaware that they should bypass uplink transmissions during the time interval and may continue to transmit over the uplink to the access point 105 during the time interval. Consequently, the STAs 110-111 may avoid collisions with transmissions from the STA 112.

Figure 3:
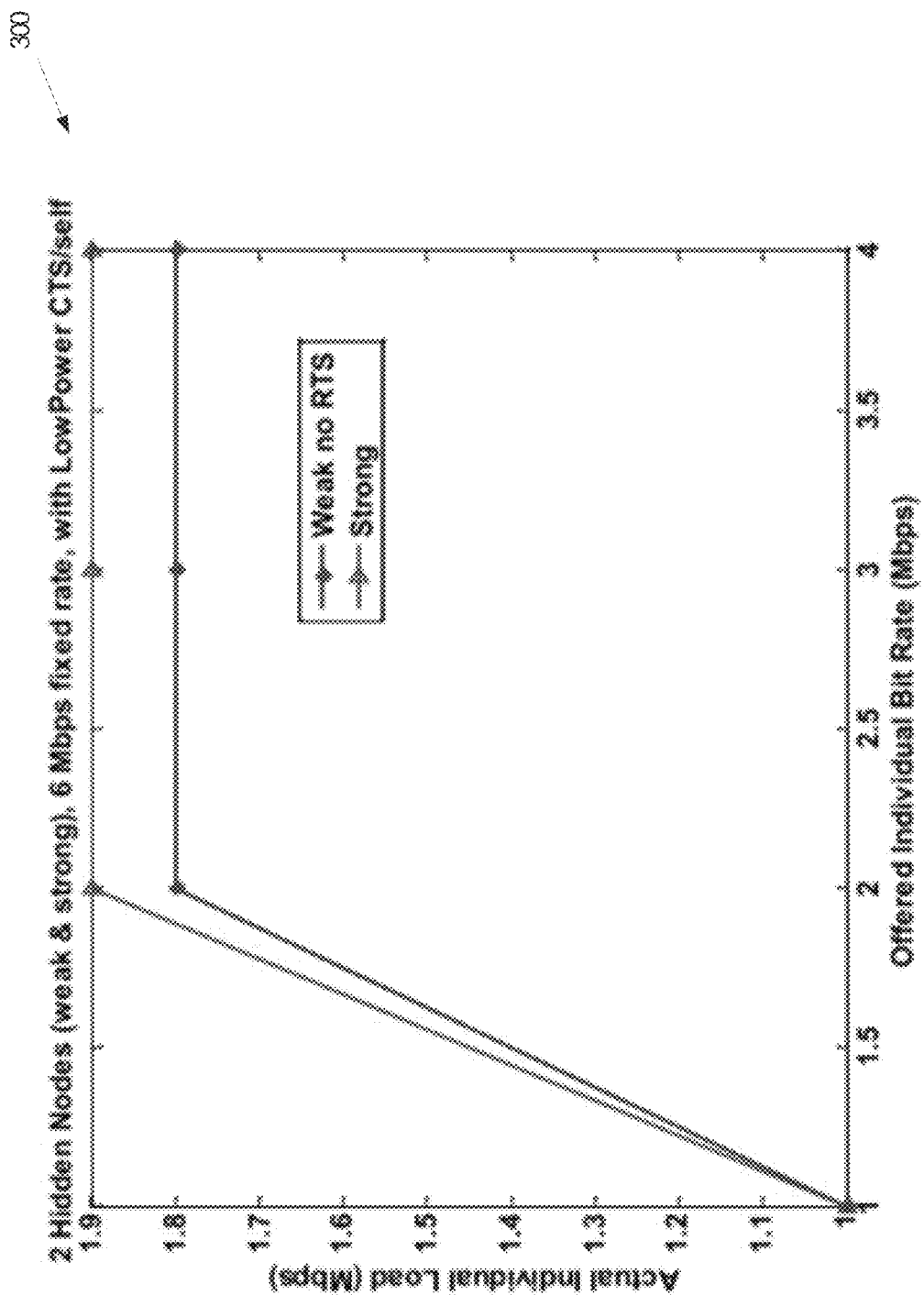
FIG. 3 is a plot of the results of a simulation of resources consumed by a strong STA and a weak STA that does not support the RTS/CTS protocol according to some embodiments.

FIG. 3 is a plot 300 of the results of a simulation of resources consumed by a strong STA and a weak STA that does not support the RTS/CTS protocol according to some embodiments. The strong STA may correspond to the STA 112 shown in FIG. 1, and the weak STA that does not support the RTS/CTS protocol may correspond to one of the STAs 110-111 shown in FIG. 1. The horizontal axis of the plot 300 indicates the individual bit rate (in Mbps) that is offered by the access point to each STA. The vertical axis of the plot 300 indicates the actual individual load (in Mbps) achieved by each of the STAs.

In the simulation used to produce the plot 300, the access point transmits a CTS-to-self message indicating that the STAs are to bypass uplink transmissions during a time interval that corresponds to approximately 40% of the time available for uplink transmissions. Some embodiments may instruct STAs to bypass uplink transmission during different fractions of the time available for uplink transmissions. The message is transmitted at a transmission power selected so that the strong STA can detect and decode the message, but the weak STA cannot detect or decode the message. Consequently, only the strong STA bypasses transmission during the time interval. The weak STA assumes that it is still permitted to transmit at any time since it did not decode the message. Uplink transmissions from the weak STA during the 40% of the time that the strong STA is bypassing uplink transmissions do not collide with uplink transmissions from the strong STA and are therefore more likely to be successfully received and decoded by the access point.

Instructing the strong STA to bypass uplink transmissions improves the overall throughput and fairness to the STAs. For example, when the offered individual bit rate is low (e.g., 1 MBps), both the strong STA and the weak STA are able to achieve an actual individual load that is approximately equal to the offered individual bit rate. As the offered individual bit rate increases, the actual individual load increases for both the strong STA and the weak STA, although the strong STA does garner a slightly larger percentage of the available airtime. The actual individual loads achieved by the strong STA and the weak STA plateau at an offered individual bit rate of approximately 2 MBps. The strong STA achieves a higher actual individual load than the weak STA at the plateau level, but the actual individual load of the weak STA is only a few percent less than the actual individual load of the strong STA, which is significantly more fair than the relative loads achieved by the strong STA and weak STA in embodiments that do not include the CTS-to-self message such as the embodiments depicted in FIG. 2.

The relative values of the actual individual loads of the week and strong STAs can be adjusted by modifying the percentage of time that the strong STA is instructed to bypass uplink transmission. For example, increasing the percentage of time that the strong STA is instructed to bypass uplink transmission may increase the ratio of the actual individual load of the weak STA to the actual individual load of the strong STA. For another example, decreasing the percentage of time that the strong STAs instructed to bypass uplink transmission may decrease the ratio of the actual individual load of the weak STA to the actual individual load of the strong STA.

Figure 4:
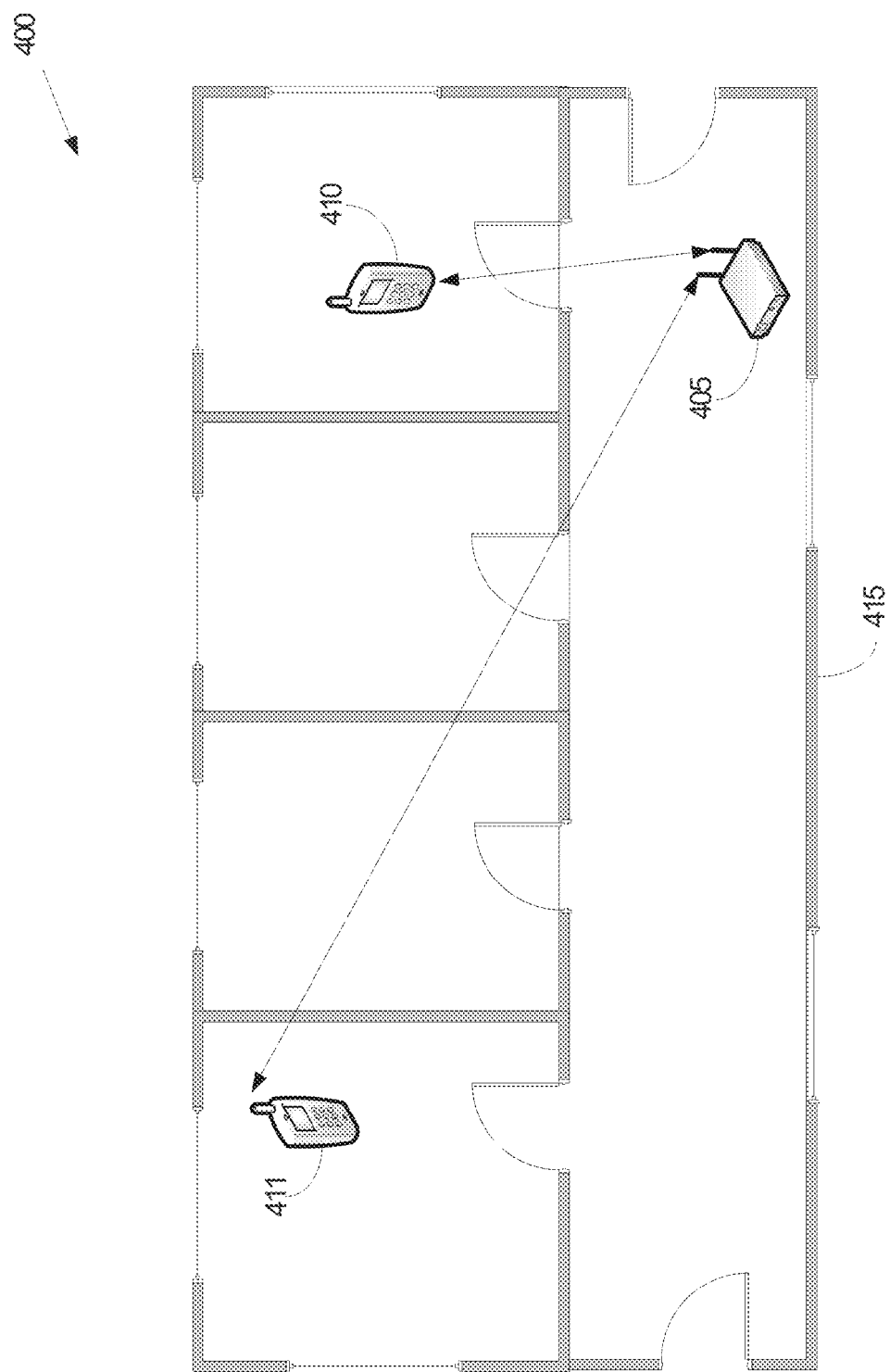
FIG. 4 is a diagram of a second example of a wireless communication system in accordance with some embodiments.

FIG. 4 is a diagram of a second example of a wireless communication system 400 in accordance with some embodiments. In the illustrated embodiment, an access point 405 is used to provide wireless connectivity to a corresponding geographic area or cell, which may include STAs 410, 411. The access point 405 and the STAs 410, 411 are deployed within a building 415 such as an office building. The STAs 410, 411 may be able to communicate with the access point 405 by exchanging uplink or downlink transmissions over the air interface. However, the STAs 410, 411 may be hidden from each other by numerous intervening walls that degrade the strength of signals transmitted between the STAs 410, 411 by many decibels. The STA 410 is relatively closer to the access point 405 than the STA 411 and a line of sight from the STA 410 to the access point 405 may pass through a doorway, which in some cases may be open. In contrast, the STA 411 is much further from the access point 405 than the STA 410 and uplink/downlink transmissions between the access point 405 and the STA 411 may pass through several walls and doorways.

The uplink transmissions from the STA 410 may therefore be relatively strong at the access point 405 and the uplink transmissions from the STA 411 may be relatively weak at the access point 405. As discussed herein, the relatively strong STA 410 may therefore dominate or even monopolize the resources (e.g., the airtime) of the access point 405, particularly as the channel utilization approaches its maximum capacity. The access point 405 may therefore instruct STAs 410, 411 to bypass uplink transmission during a fraction of the time available for uplink transmissions. The access point 405 selects a transmission power for the message so that the strong STA 410 can detect and decode the message, but the weak STA 411 cannot detect or decode the message. Consequently, only the strong STA 410 bypasses transmission during the time interval. The weak STA 411 assumes that it is still permitted to transmit at any time, since it did not decode the message and uplink transmissions from the access point 405. The weak STA 411 may therefore avoid collisions with uplink transmissions from the strong STA 410 during this time interval.

Figure 5:
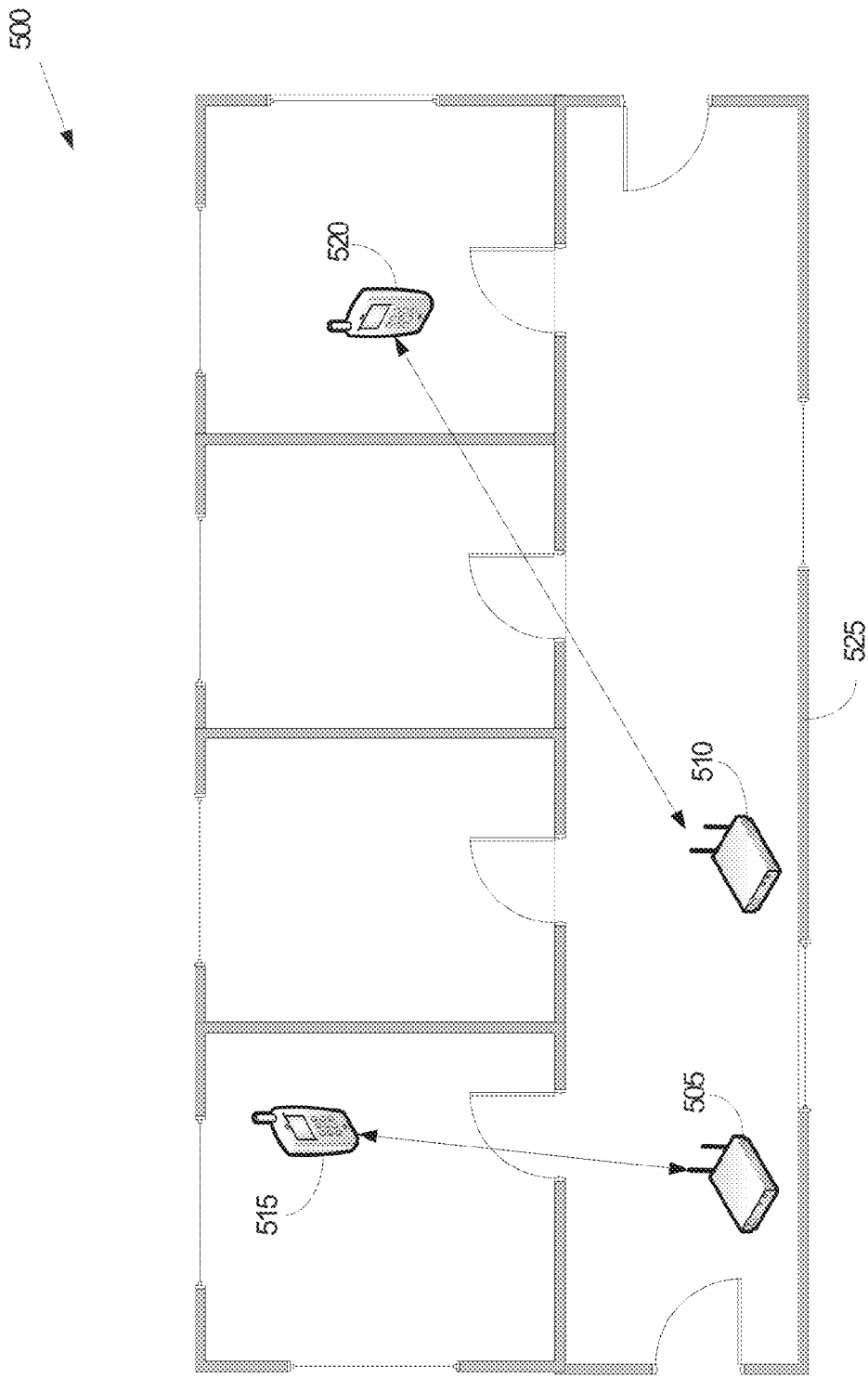
FIG. 5 is a diagram of a third example of a wireless communication system in accordance with some embodiments.

FIG. 5 is a diagram of a third example of a wireless communication system 500 in accordance with some embodiments. In the illustrated embodiment, access points 505, 510 are used to provide wireless connectivity to corresponding geographic areas or cells, which may include STAs 515, 520. For example, the access point 505 may provide wireless connectivity to the STA 515 and the access point 510 may provide wireless connectivity to the STA 520. The access points 505, 510 and the STAs 515, 520 are deployed within a building 525 such as an office building. The STA 515 shown in FIG. 5 is physically closer to the access point 510 than the STA 520. Consequently, signals from the STA 515 may generate strong interference with signals from the STA 520 at the access point 510, even though the STA 515 may not be associated with or communicating with the access point 510.

Collisions between the signals transmitted by the STA 515 and the STA 520 may reduce the resources of the access point 510 that are consumed by the STA 520. The access point 510 may therefore instruct STAs 515, 520 to bypass uplink transmission during a fraction of the time available for uplink transmissions. Even though the STA 515 may not be subscribed to or registered with the access point 510, the STA 510 may still be able to receive and decode messages transmitted by the STA 510. The access point 510 selects a transmission power for the message so that the STA 515 can detect and decode the message, but the STA 520 cannot detect or decode the message. Consequently, only the STA 515 bypasses transmission during the time interval. The STA 520 assumes that it is still permitted to transmit at any time since it did not decode the message and uplink transmissions from the STA 520 may therefore avoid collisions with uplink transmissions from the STA 515 during this time interval.

Figure 6:
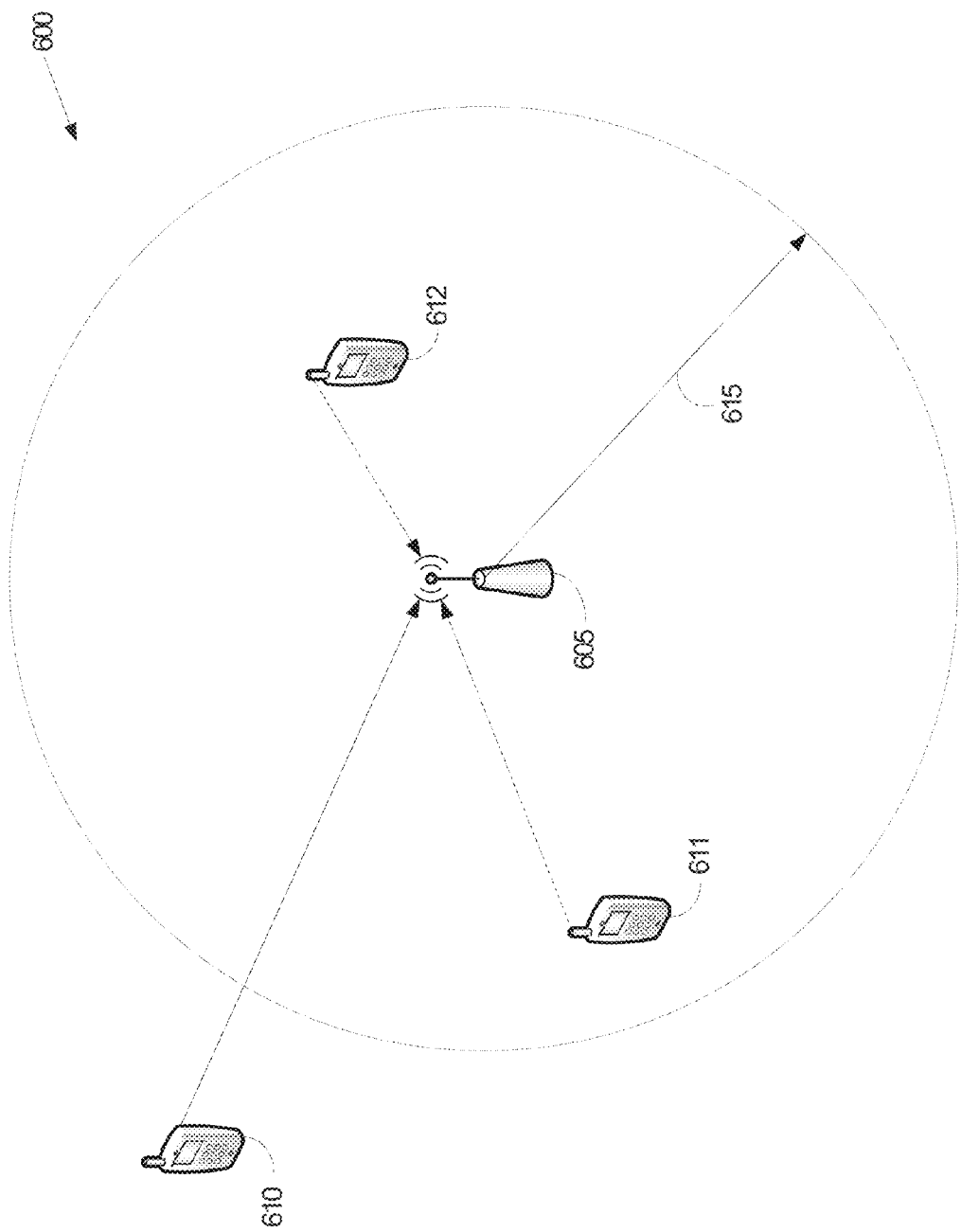
FIG. 6 is a diagram of a fourth example of a wireless communication system according to some embodiments.

FIG. 6 is a diagram of a fourth example of a wireless communication system 600 according to some embodiments. In the illustrated embodiment, an access point 605 is used to provide wireless connectivity to a corresponding geographic area or cell, which may include STAs 610, 611, 612 (collectively referred to herein as "the STAs 610-612"). The STAs 610-612 are deployed at varying distances from the access point 605 and may therefore have different signal strengths at the access point 605. Although the variation in the signal strength of the STAs 610-612 may be the result of different distances, the variations in the signal strength of the STAs 610-612 may also be the result of other factors such as varying transmission powers of the STAs 610-612, varying environmental conditions, intervening obstructions, variations in the antenna patterns associated with the access point 605, and the like.

The uplink signals transmitted by the STAs 611, 612 may be relatively strong at the access point 605 compared to uplink signals transmitted by the STA 610. The access point may therefore transmit a message instructing the STAs 610-612 to bypass transmission during a time interval. The transmission power of the message may be selected so that STAs beyond a radius 615 corresponding to the selected threshold transmission power may not be able to detect or decode the message. STAs beyond the radius 615 may therefore continue to transmit uplink signals during the time interval indicated in the message. For example, the STAs 611, 612 are within the radius 615 and may detect and decode the message. The STAs 611, 612 may therefore bypass uplink transmission during the time interval indicated in the message, as indicated by the dashed arrows. The STA 610 is beyond the radius 615 and may not detect or decode the message. The STA 610 may therefore continue to transmit uplink signals during the time interval indicated in the message, as indicated by the solid arrow.

Figure 7:
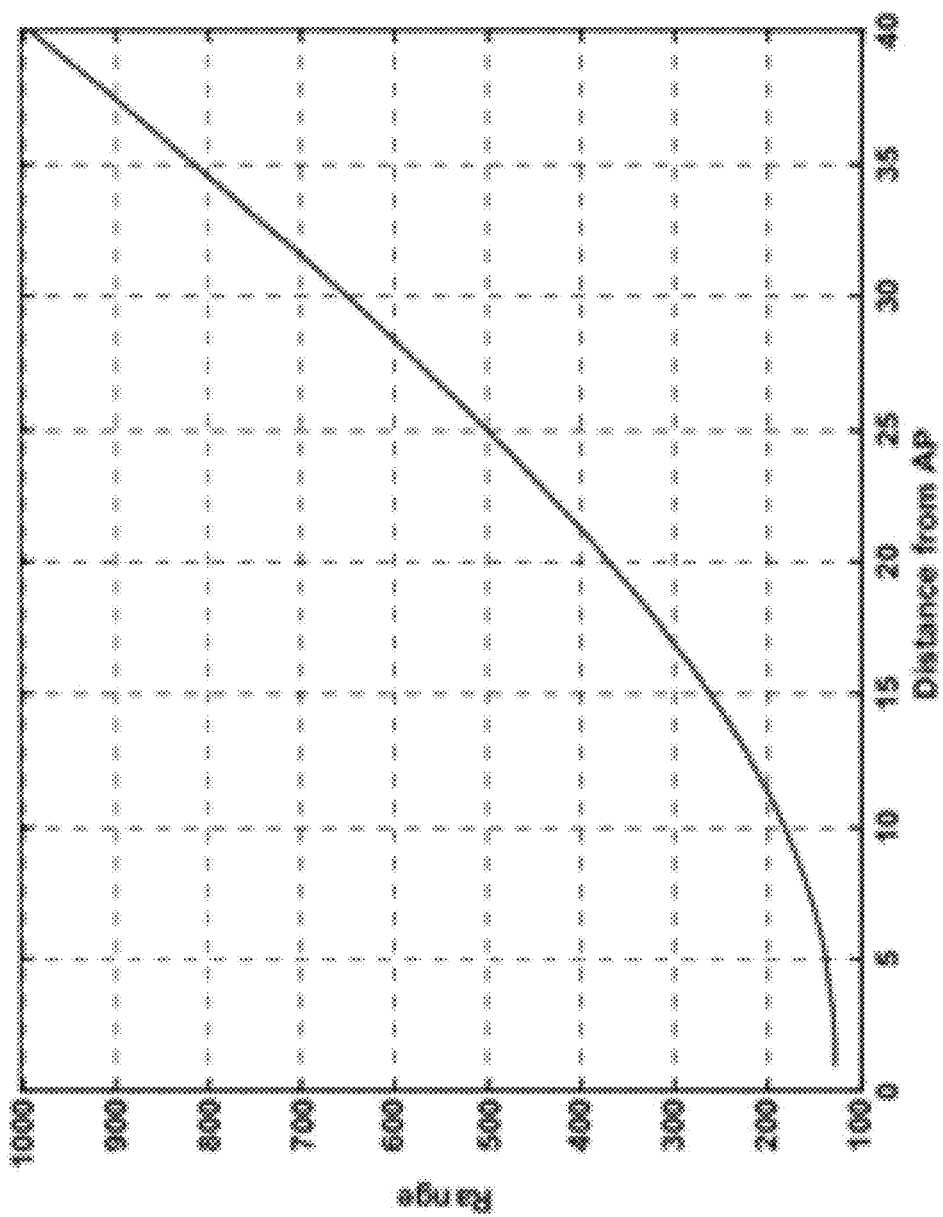
FIG. 7 is a plot of a maximum silencing range for an indoor user, an outdoor access point, and an outdoor line of sight interferer according to some embodiments.

FIG. 7 is a plot 700 of a maximum silencing range for an indoor user, an outdoor access point, and an outdoor line of sight interferer according to some embodiments. The maximum silencing range represents how far the interferer can be from the outdoor access point and still detect and decode the message indicating the time interval that it should bypass uplink transmissions. The horizontal axis indicates the distance of the indoor user from the outdoor access point in meters and the vertical axis indicates the distance of the outdoor interferer from the outdoor access point in meters. Since the signals transmitted between the indoor user and the outdoor access point are degraded by many decibels, messages transmitted from the outdoor access point can be detected/decoded by outdoor interferers at much larger distances and still not be detected/decoded by the indoor user.

The plot 700 is generated assuming that $P_{min}$ is the minimum transmit power necessary for an indoor user to hear a reference message such as a CTS message transmitted using the modulation and coding scheme 0 (MCS0) defined by the IEEE 802.11 standards. The value of $P_{min}$ becomes smaller the closer the indoor user is to the access point and smaller values of $P_{min}$ mean that the interferer must also be closer to the access point to decode the reference message. The range for the indoor user is determined based on an uplink power of 14 dBm+8 dBi antenna gain at the access point. The access point is assumed to transmit a low power CTS-to-self message at a margin of 6 dB below the minimum power needed for the indoor user to decode signals transmitted at a frequency of 6 MHz, such as messages transmitted using MCS0. The maximum silencing range ($R_{MAX}$) shown in the plot 700 may therefore be determined for an indoor user at distance d from the access point by:

$$R_{MAX}=10^{(p^*-46)/20}$$

where $p^*=P_{min}(d)-6$ dB.

Figure 8:
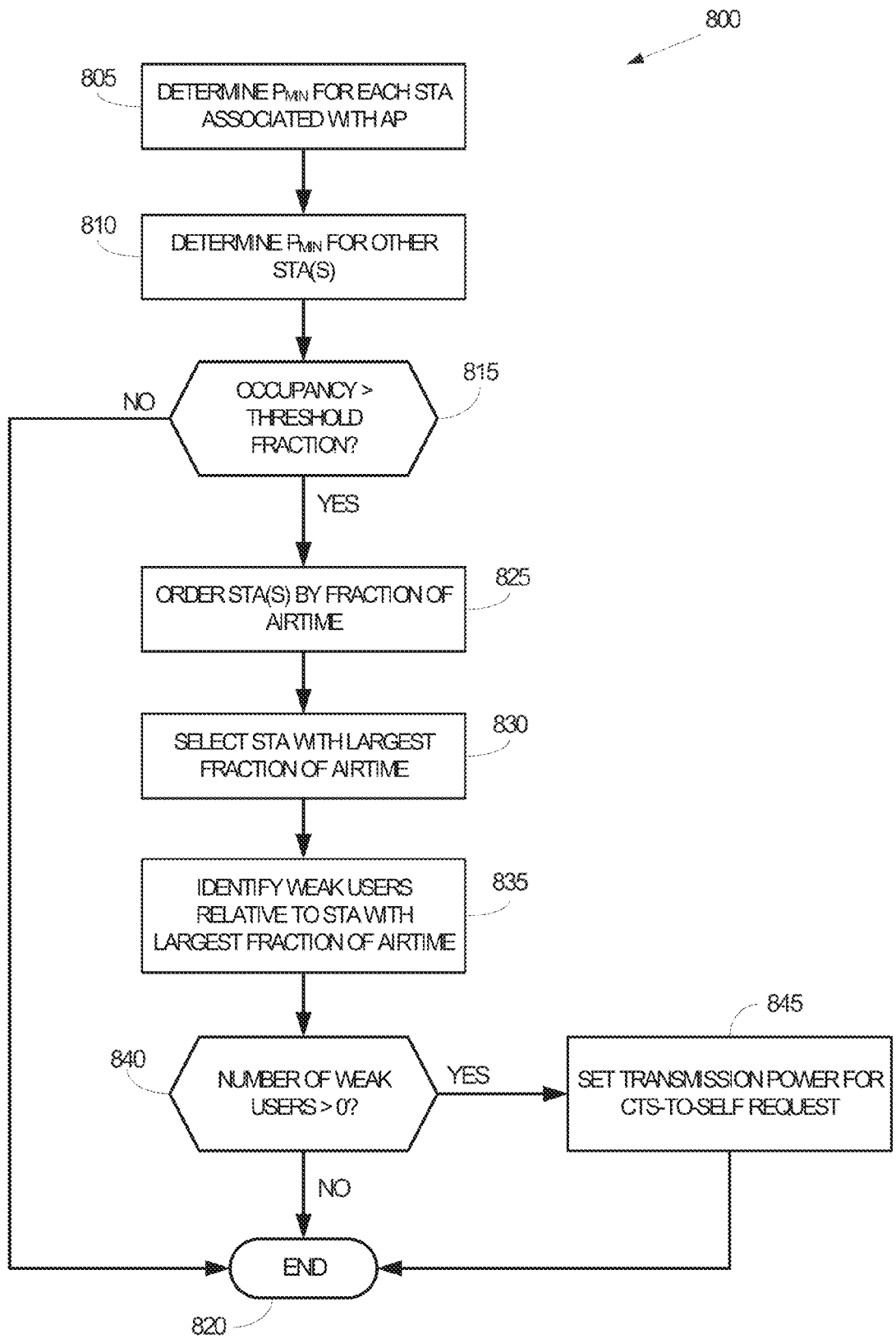
FIG. 8 is a flow diagram of a method of determining a transmission power for a message that indicates that stations (STAs) should bypass uplink transmission during a time interval according to some embodiments.

FIG. 8 is a flow diagram of a method 800 of determining a transmission power for a message that indicates that stations (STAs) should bypass uplink transmission during a time interval according to some embodiments. The method 800 may be implemented in an access point such as the access points 105, 405, 505, 510 shown in FIGS. 1, 4, and 5. The access point is associated with one or more STAs, e.g., because the STAs are subscribed to or registered with the access point. At block 805, the access point determines the minimum transmit power ($P_{min}$) needed for each associated STA to decode a reference message such as a message transmitted at 6 MHz using MCS0. For example, the access point may determine a set of minimum transmit powers $\{P_{min}(1), \ldots, P_{min}(N)\}$ for the access points phone STAs. In some embodiments, the access point may also determine the minimum transmit power ($P_{min}$) needed for other STAs (e.g., STAs that are not explicitly associated with the access point) to decode the reference message at block 810. For example, the access point may determine a set of minimum transmit powers $\{P_{min}(N+1), \ldots, P_{min}(M)\}$ for other STAs and/or access points. Some embodiments of the access point may determine the set of minimum transmit powers using other techniques such as transmitting or broadcasting queries at different transmit powers and determining the minimum transmit powers based on responses to the queries received from the STAs. For example, the minimum transmit power for an STA may correspond to the lowest power used to transmit a query that generated a response from the STA.

At decision block 815, the access point determines whether the percentage of the access point's airtime consumed by the STAs, which may also be referred to as the occupancy of the access point, exceeds a threshold fraction. For example, the access point may determine whether the occupancy is more than 50%. If not, the access point may decide that the STAs are receiving a fair proportion of the airtime and it is not necessary to reserve space for weaker STAs to transmit. The method 800 may therefore end at block 820. If the occupancy exceeds the threshold fraction, the method may proceed to block 825.

At block 825, the access point sorts or orders the STAs by the fraction of the access point airtime used by uplink transmissions from each STA. For example, the access point may detect and decode signals from stronger STAs more frequently than signals from weaker STAs and so the stronger STAs may consume a larger fraction of the access point airtime. At block 830, the access point selects the STA that uses the largest fraction of airtime. The selected STA may be the strongest STA from among the STAs associated with the access point.

At block 835, the access point identifies weak STAs relative to the selected STA having the largest fraction of the access point airtime. The weak STAs may be identified using a known or guessed valued of the minimum transmit power ($P_{min}$) of the selected STA. For example, if the minimum transmit power ($P_{min}(k^*)$) of the selected STA k* is not known, then the minimum transmit power may be guessed, e.g., based on an estimated transmit power ($P_{est}$) and a received transmit power ($P_{rcvd}$) during a previous timeframe (t−1):

$$P_{min}(k^*)=-90 \text{ dBm}+(P_{est}(k^*)-P_{rcvd}(t-1,k^*))$$

Otherwise, the value of the minimum transmit power ($P_{min}(k^*)$) of the selected STA k* determined at block 805 or block 810 may be used. The number of weak STAs can then be identified as the number of STAs that have values of Pan that are larger than $P_{min}(k^*)+\sigma$, where $\sigma$ is a selected margin in transmit power reduction (dB).

At decision block 840, the access point determines whether any weak STAs have been identified. If not, the method 800 may end at block 820. If the access point identifies one or more weak STAs, the access point may set the transmission power for the CTS-to-self request message at block 840. For example, the transmission power (p*) may be set to $p^*=P_{min}(k^*)+\sigma$. The access point may then transmit messages at the transmission power (p*) indicating the time interval for bypassing uplink transmissions.

Figure 9:
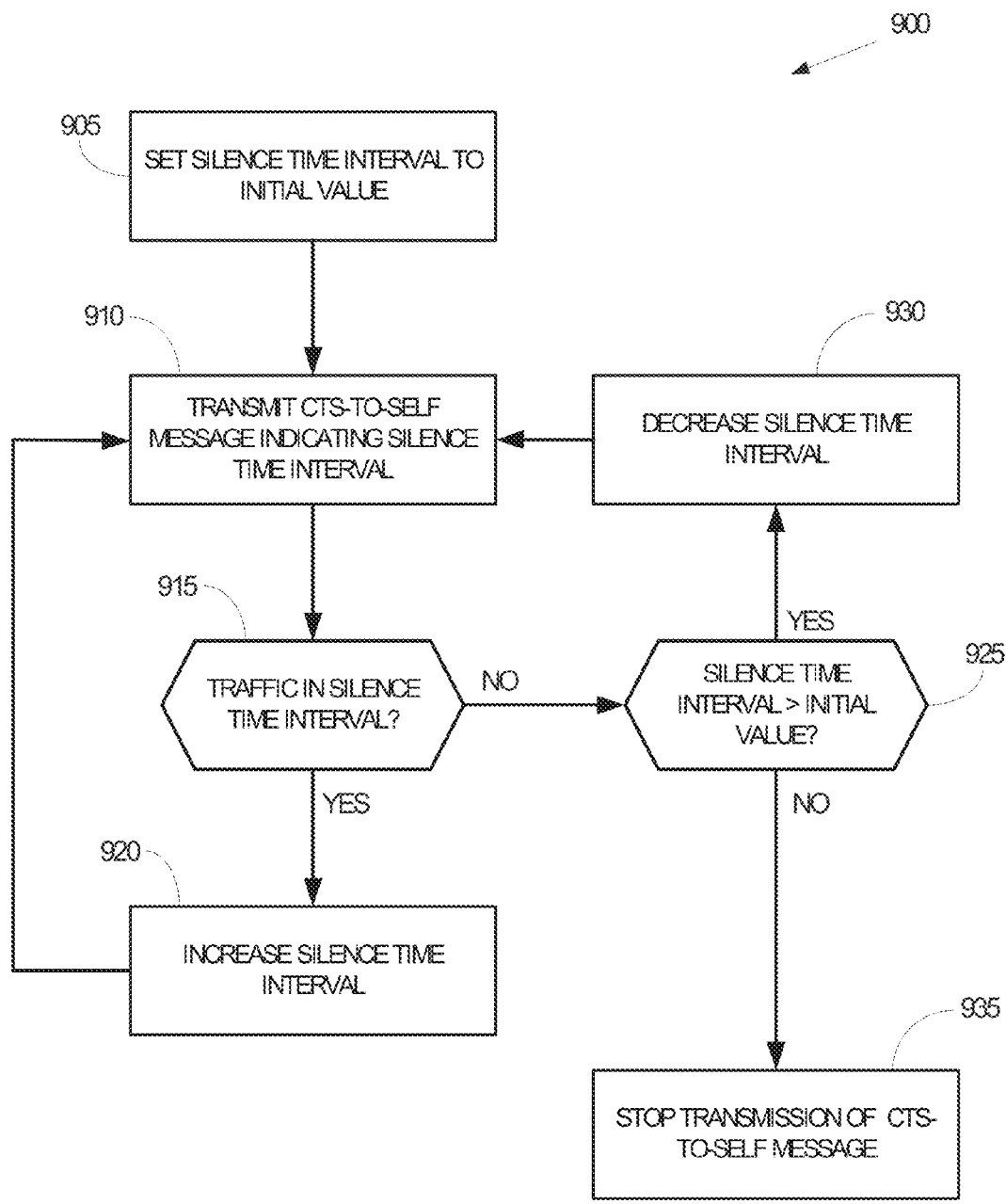
FIG. 9 is a flow diagram of a method for determining a silence time interval to transmit in a CTS-to-self message according to some embodiments.

FIG. 9 is a flow diagram of a method 900 for determining a silence time interval to transmit in a CTS-to-self message according to some embodiments. The method 900 may be implemented in an access point such as the access points 105, 405, 505, 510 shown in FIGS. 1, 4, and 5, which may transmit the CTS-to-self message at a transmission power determined as described in FIG. 8. At block 905, the access point may set the silence time interval to an initial value. For example, the access point may set the silence time interval to the lowest value ($d_0$) in a set of silence time intervals, $D=\{d_0, d_1, \ldots, d_I\}$. At block 910, the access point transmits a CTS-to-self message indicating the silence time interval.

At decision block 915, the access point then monitors uplink transmissions that may be received during the subsequent silence time interval and determines whether any uplink transmissions were received. If uplink transmissions were received, indicating that weak STAs are taking advantage of the silence time interval to transmit information over the uplink, the access point may increase the silence time interval at block 920. For example, the access point may select the next highest time in the set of silence time intervals, may increase the silence time interval by a predetermined increment, or may use some other method of increasing the silence time interval. The access point may then transmit (at block 910) another CTS-to-self message indicating the modified (increased) silence time interval.

If no uplink transmissions were received, or the level of uplink transmissions was below a minimum threshold, the access point determines whether the silence time interval is larger than the initial value of the silence time interval at decision block 925. If so, the access point may decrease the silence time interval at block 930. For example, the access point may select the next lowest time in the set of silence time intervals, may decrease the silence time interval by a predetermined increment, or may use some other method of decreasing the silence time interval. The access point may then transmit (at block 910) another CTS-to-self message indicating the modified (decreased) silence time interval. If not, the access point may conclude that transmitting the CTS-to-self message is not providing sufficient benefit and may therefore stop transmission of the CTS-to-self messages at block 935.

Figure 10:
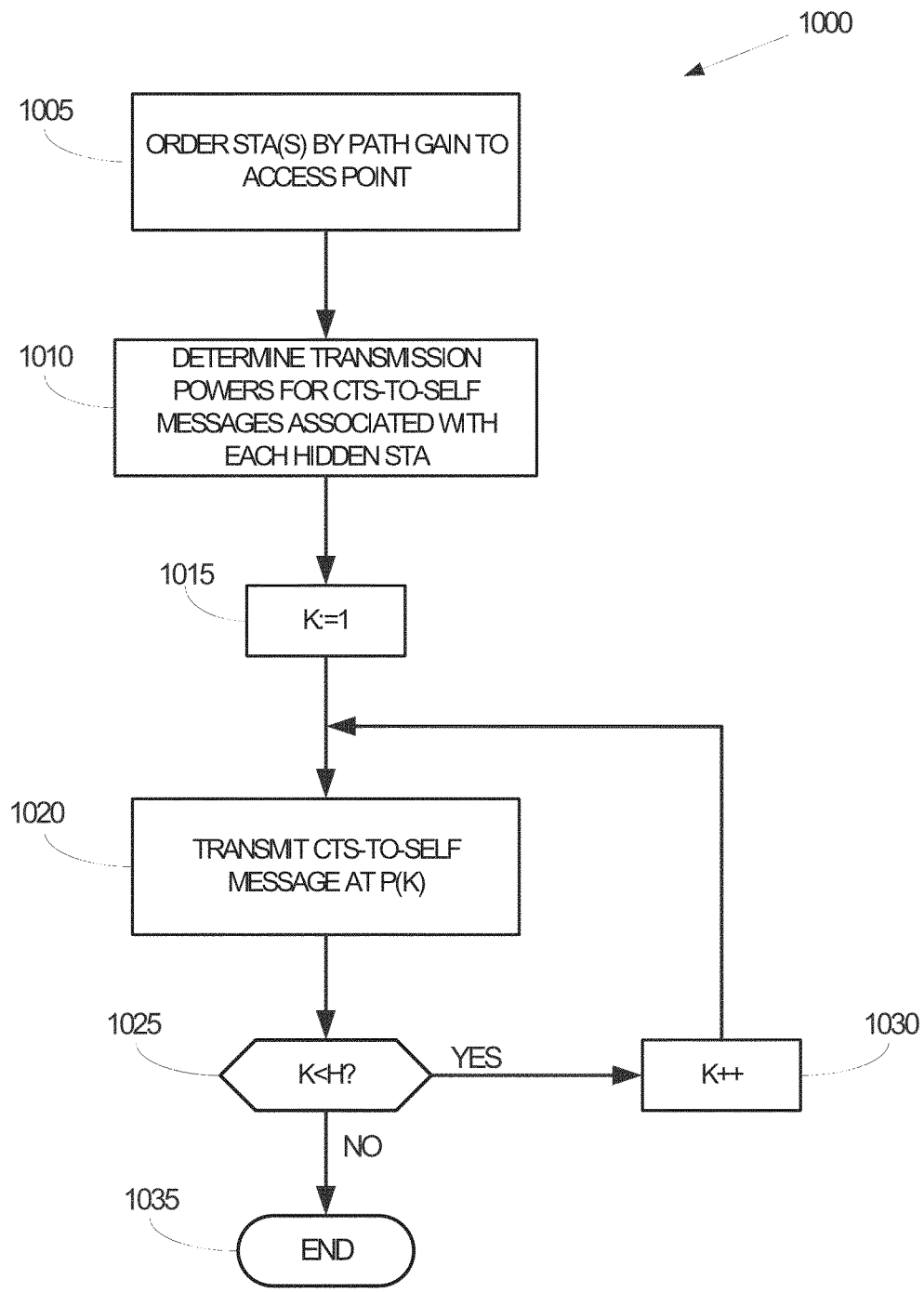
FIG. 10 is a flow diagram of a method for transmitting a plurality of CTS-to-self messages at different transmission powers according to some embodiments.

FIG. 10 is a flow diagram of a method 1000 for transmitting a plurality of CTS-to-self messages at different transmission powers according to some embodiments. The method 1000 may be implemented in an access point such as the access points 105, 405, 505, 510 shown in FIGS. 1, 4, and 5. The access point is connected to or associated with a number (N) of STAs and a subset (H≤N) of the STAs are hidden nodes. At block 1005, the access point orders the STAs on the basis of their path gain to the access point. The path gain can be determined using conventional measurements or signaling such as measurements of signal-to-noise ratios (SNRs), signal to interference plus noise ratios (SINRs), received signal strength indicators (RSSIs), and the like. For example, the access point may determine an ordered set $S=\{s_1, s_2, s_3, \ldots, s_N\}$ of the N STAs that orders the STAs from lowest path gain to highest path gain, i.e., from the weakest signal received at the access point to the strongest signal received at the access point. The first H nodes represent the hidden subset of the STAs, $S_H=\{s_1, s_2, s_3, \ldots, s_H\}$. Some embodiments of the method 1000 may ignore nodes that are not hidden, e.g., because the media access control (MAC) backoff rules may work properly for the nodes that are not hidden.

At block 1010, the access point determines transmission powers used to transmit a plurality of CTS-to-self messages. Each transmission power is associated with a different hidden STA and is determined so that the hidden STA used to calculate the transmission power (and any hidden STAs having lower path gains) are not able to decode the CTS-to-self message transmitted at the transmission power. For example, the transmission power P(k) associated with the k-th hidden STA may be determined to partition the ordered set S into a first subset $S_1(k)$ that includes the STAs having higher path gains than the k-th hidden STA and a second subset $S_2(k)$ that includes the k-th hidden STA and the STAs having lower path gains than the k-th hidden STA. The transmission power P(k) associated with the k-th hidden STA is determined so that the STAs in the first subset $S_1(k)$ can hear and decode the CTS-to-self message transmitted at the transmission power P(k) and the STAs in the second subset $S_2(k)$ do not hear or decode the CTS-to-self message transmitted at the transmission power P(k).

At block 1015, the access point begins iteratively transmitting CTS-to-self messages at the different transmission powers. Some embodiments initialize the index k to the value 1 corresponding to the hidden STA with the lowest path gain to the access point. At block 1020, the access point transmits a CTS-to-self message at the transmission power P(1), which is determined so that only the hidden STA with the lowest path gain is unable to hear or decode the CTS-to-self message. This hidden STA is therefore able to transmit messages over the uplink to the access point contention-free during the time interval indicated in the CTS-to-self message. As long as the value of the index is determined to be less than the number (H) of hidden STAs at decision block 1025, the index may be incremented at block 1030 and a subsequent CTS-to-self message may be transmitted (at block 1020) at a lower transmit power than the previous CTS-to-self message. Otherwise, the method 1000 may end at block 1035.

Since the STAs are ordered on the basis of their path gain to the access point, the transmission power that is used to transmit the CTS-to-self message at block 1020 during each iteration of the method 1000 is reduced relative to the transmission power used to transmit the previous CTS-to-self message at block 1020. For example, P(1)<P(2) because the path gain to the first STA in the set S is less than the path gain to the second STA in the set S and a lower transmission power is used in the second iteration so that the second STA is not able to hear or decode the CTS-to-self message transmitted at the second transmission power P(2). Thus, a larger subset of the hidden STAs is not able to hear or decode the CTS-to-self message in each successive iteration of the method 1000. Conflict or contention may arise between the multiple hidden STAs in the subset of the hidden STAs that are not able to hear or decode the CTS-to-self message. However, the hidden STA with the largest path gain should be received at the access point in that event. Fairness may be maintained between the hidden STAs because hidden STAs with lower path gains in one iteration would have been the hidden STA with the largest path gain in a previous iteration.

FIG. 11 is a diagram of a fifth example of a wireless communication system 1100 according to some embodiments. The wireless communication system 1100 includes a plurality of STAs 1105 that are associated with an access point 1110. The STAs 1105 are located at different distances from the access point 1110 and so they have different path gains to the access point 1110. For example, the path gain of the STA 1105(1) is smaller than the path gain of the STA 1105(N). However, in some embodiments, differences in the path gains of the STAs 1105 may be due to other factors such as obstructions, environmental conditions, antenna patterns, and the like. The STAs 1105(1-H) are hidden nodes in the wireless communication system 1100. The access point 1110 may implement embodiments of the method 1000 shown in FIG. 10 for ordering the STAs 1105 based on their path gains and then transmitting CTS-to-self messages at transmission powers that are determined so that different subsets of the hidden STAs 1105(1-H) are unable to hear or decode the CTS-to-self messages. The different subsets of the hidden STAs 1105(1-H) may therefore transmit during different silence time intervals indicated in the CTS-to-self messages.

Some embodiments of the access point 1110 may transmit a first CTS-to-self message at a first transmission power so that the STA 1105(1) is outside a range 1115 of the first CTS-to-self message. The STA 1105(1) is unable to hear or decode the first CTS-to-self message. The first CTS-to-self message indicates a first silence time interval during which the STAs 1105 (2-N) that can hear and decode the first CTS-to-self message bypass uplink transmissions. Since the STA 1105(1) does not hear or decode the first CTS-to-self message, the STA 1105(1) may transmit uplink messages contention-free, e.g., without contending with uplink transmissions from the STAs 1105(2-N).

The access point 1110 may subsequently transmit a second CTS-to-self message at a second transmission power (less than the first transmission power) so that the STAs 1105(1-2) are outside the range 1120 and are therefore unable to hear or decode the second CTS-to-self message. The second CTS-to-self message indicates a second silence time interval during which the STAs 1105(3-N) that can hear and decode the second CTS-to-self message bypass uplink transmissions. The second silence time interval may be different than the first silence time interval. The STAs 1105(1-2) do not hear or decode the second CTS-to-self message and may therefore transmit during the second silence time interval. Although uplink messages from the STAs 1105(1-2) may contend during the second silence time interval, the STA 1105(2) is stronger than the STA 1105(1) and should therefore gain access to the access point 1110. Fairness is preserved because the STA 1105(1) had contention free access to the access point 1110 during the first silence time interval.

Transmission of the CTS-to-self messages at decreasing transmission powers may be continued until all of the hidden STAs 1105(1-H) have been given priority for uplink transmission during a silence time interval, e.g., until the H-th CTS-to-self message with a range 1125 has been transmitted.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
    determining, at an access point, minimum transmit powers for a plurality of stations (STAs), wherein each minimum transmit power represents the minimum transmit power for the associated STA to decode a reference message transmitted from the access point;
    determining, based on the minimum transmit powers, a transmission power sufficient for a first portion of the STAs to decode at least one first message and insufficient for a second portion of the STAs to decode said at least one first message,
    transmitting, from the access point at the determined transmission power, the at least one first message instructing the STAs to bypass uplink transmissions for a first time interval indicated in said at least one first message, wherein transmitting said at least one first message comprises transmitting a plurality of first messages corresponding to a plurality of hidden STAs associated with the access point, wherein the plurality of first messages are transmitted at a plurality of different transmission powers that are determined based on the minimum transmit powers;

ordering the plurality of hidden STAs based on their path gains to the access point; and determining the plurality of different transmission powers such that each of the plurality of different transmission powers corresponds to a different hidden STA and the second portion of the STAs associated with each of the plurality of different transmission powers includes the corresponding hidden STA and the hidden STAs that have lower path gains than the corresponding hidden STA, and wherein the first portion of the STAs associated with each of the plurality of different transmission powers includes the hidden STAs that have higher path gains than the corresponding hidden STA.

* * * * *